(12) United States Patent
Murakami

(10) Patent No.: US 8,261,895 B2
(45) Date of Patent: Sep. 11, 2012

(54) HYDRAULIC SHOCK ABSORBER

(75) Inventor: Yosuke Murakami, Shizuoka (JP)

(73) Assignee: Showa Corporation, Saitama (JP)

( * ) Notice: Subject to any disclaimer, the term of this patent is extended or adjusted under 35 U.S.C. 154(b) by 674 days.

(21) Appl. No.: 12/334,422

(22) Filed: Dec. 12, 2008

(65) Prior Publication Data

US 2009/0266657 A1    Oct. 29, 2009

(30) Foreign Application Priority Data

Apr. 28, 2008    (JP) .................. 2008-117699

(51) Int. Cl.
*F16F 9/06*    (2006.01)

(52) U.S. Cl. ........ 188/313; 188/317; 267/217; 267/226; 280/124.158; 280/124.164; 280/124.179

(58) Field of Classification Search ............ 188/321.11, 188/297, 313, 316, 317, 319.1, 319.2; 267/195, 267/217, 221, 225, 226, 170, 178; 280/124.157, 280/124.158, 124.162, 124.164, 124.165, 280/124.168, 124.179
See application file for complete search history.

(56) References Cited

U.S. PATENT DOCUMENTS 7,913,823 B2 *   3/2011   Murakami .................. 188/314

FOREIGN PATENT DOCUMENTS

| JP | U1-1984-004841 | | 1/1984 |
| JP | 2007170652 A | * | 7/2007 |
| JP | 2007225066 A | * | 9/2007 |
| JP | 2007255538 A | * | 10/2007 |
| JP | 2008-8341 | | 1/2008 |

* cited by examiner

Primary Examiner — Thomas J Williams
(74) Attorney, Agent, or Firm — Keith H. Orum; Orum & Roth LLC

(57) ABSTRACT

There is provided a hydraulic shock absorber including a spring receiver that is supported so as to be not rotatable with respect to the axle bracket. The spring receiver is divided into a spring receiver base portion that has an outer diameter smaller than an inner periphery of an axle-side tube, and a spring receiver cylindrical portion that is inserted into an inner periphery of the axle-side tube and a suspension spring is seated thereon. A lower end engagement portion provided at a lower end of the spring receiver cylindrical portion is seated on an upper end engagement portion provided at an upper end of the spring receiver base portion, so that the spring receiver cylindrical portion is concentrically set to the axle-side tube.

16 Claims, 13 Drawing Sheets

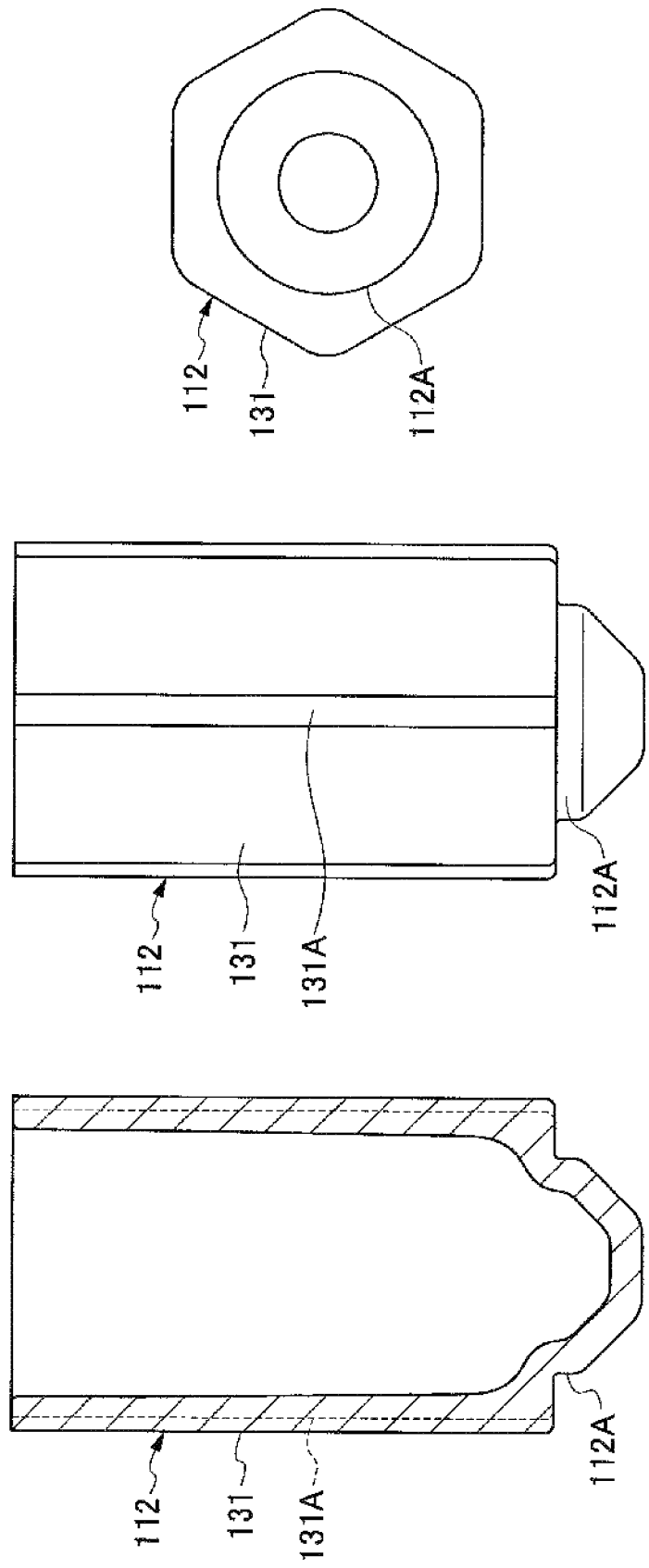

HYDRAULIC SHOCK ABSORBER

BACKGROUND OF THE INVENTION

1. Field of the Invention

The present invention relates to a hydraulic shock absorber.

2. Description of the Related Art

Japanese Patent Application Laid-Open (JP-A) No. 2008-8341 (Patent Document 1) discloses a hydraulic shock absorber in which a lower end of an axle-side tube, which is slidably inserted into a vehicle body-side tube, is threadedly engaged with an axle bracket, and a lower end of a suspension spring, which is interposed between a vehicle body-side tube and an axle-side tube, is seated on a spring receiver supported by the axle bracket in the axle-side tube.

Further, the hydraulic shock absorber disclosed in Patent Document 1 includes a spring load adjusting portion, which adjusts a spring load of the suspension spring by vertically moving the spring receiver, on the axle bracket. The spring receiver is inserted so as to come in contact with the inner periphery of the axle-side tube and concentrically set to the axle-side tube, and is supported to not rotate with respect to the axle bracket by being engaged with the spring load adjusting portion.

When the hydraulic shock absorber disclosed in Patent Document 1 is assembled, the spring load adjusting portion and the spring receiver are assembled to the axle bracket and the lower end of the axle-side tube is threadedly engaged with the axle bracket. In this case, as described above, the spring receiver is supported by the axle bracket so as to not rotate with respect to the axle bracket by being engaged with the spring load adjusting portion, and is inserted so as to come in contact with the inner periphery of the axle-side tube. For this reason, if the axle bracket is threadedly rotated in order to be threadedly engaged with the axle-side tube, the spring load adjusting portion, which is rotated with the axle bracket as a single body, applies a rotation force to the spring receiver through a point engaged with the spring receiver. Therefore, the spring receiver is rotated about a rotation center that is a point engaged with the spring load adjusting portion. Since the rotation center is separate from the center axis of the axle-side tube, an outer edge distant from the rotation center of the spring receiver is engaged with the inner periphery of the axle-side tube, so that the rotation is locked. Accordingly, the axle bracket cannot be threadedly rotated. Therefore, there is a concern that the axle bracket cannot be threadedly engaged with the axle-side tube or damage of the spring receiver or the spring load adjusting portion is caused.

SUMMARY OF THE INVENTION

An object of the present invention is to facilitate assembly of a hydraulic shock absorber.

Another object of the present invention is to smoothly threadedly engage an axle bracket with an axle-side tube in a hydraulic shock absorber in which a spring receiver, which is supported by the axle bracket so as to not be rotatable with respect to the axle bracket, is inserted so as to come in contact with the inner periphery of the axle-side tube.

The present invention relate to a hydraulic shock absorber in which a lower end of an axle-side tube slidably inserted into a vehicle body-side tube is threadedly engaged with an axle bracket, and a lower end of a suspension spring interposed between the vehicle body-side tube and the axle-side tube is seated on a spring receiver supported so as to not be rotatable with respect to the axle bracket in the axle-side tube. The hydraulic shock absorber comprises a spring receiver that is supported so as to not be rotatable with respect to the axle bracket. The spring receiver is divided into a spring receiver base portion that has an outer diameter smaller than an inner periphery of the axle-side tube, and a spring receiver cylindrical portion that is inserted into an inner periphery of the axle-side tube and the suspension spring is seated thereon. A lower end engagement portion provided at a lower end of the spring receiver cylindrical portion is seated on an upper end engagement portion provided at an upper end of the spring receiver base portion, so that the spring receiver cylindrical portion is concentrically set to the axle-side tube.

BRIEF DESCRIPTION OF THE DRAWINGS

The present invention will be more fully understood from the detailed description given below and from the accompanying drawings which should not be taken to be a limitation on the invention, but are for explanation and understanding only.

The Drawings:

FIGS. 5A to 5C show a nut, wherein FIG. 5A is a sectional view, FIG. 5B is a front view, and FIG. 5C is a rear view;

FIGS. 6A and 6B show a slider, wherein FIG. 6A is a side view and FIG. 6B is a front view;

FIGS. 7A and 7B shows a spring receiver base portion, wherein FIG. 7A is a side view and FIG. 7B is a rear view;

FIGS. 8A to 8C show a spring receiver cylindrical portion, wherein FIG. 8A is a sectional view, FIG. 8B is a side view, and FIG. 8C is a bottom view.

FIGS. 10A and 10B show fall prevention means of the spring receiver, wherein FIG. 10A is a rear view showing that the spring receiver is erected, and FIG. 10B is a rear view showing that the spring receiver is inverted;

FIGS. 11A and 11B show fall prevention means of the spring receiver, wherein FIG. 11A is a rear view showing that the spring receiver is erected, and FIG. 11B is a rear view showing that the spring receiver is inverted;

FIGS. 12A and 12B show fall prevention means of the spring receiver, wherein FIG. 12A is a rear view showing that the spring receiver is erected, and FIG. 12B is a rear view showing that the spring receiver is inverted; and FIGS. 13A and 13B show fell prevention means of the spring receiver, wherein FIG. 13A is a rear view showing that the spring receiver is erected, and FIG. 13B is a rear view showing that the spring receiver is inverted.

DESCRIPTION OF THE PREFERRED EMBODIMENTS

Figure 1:
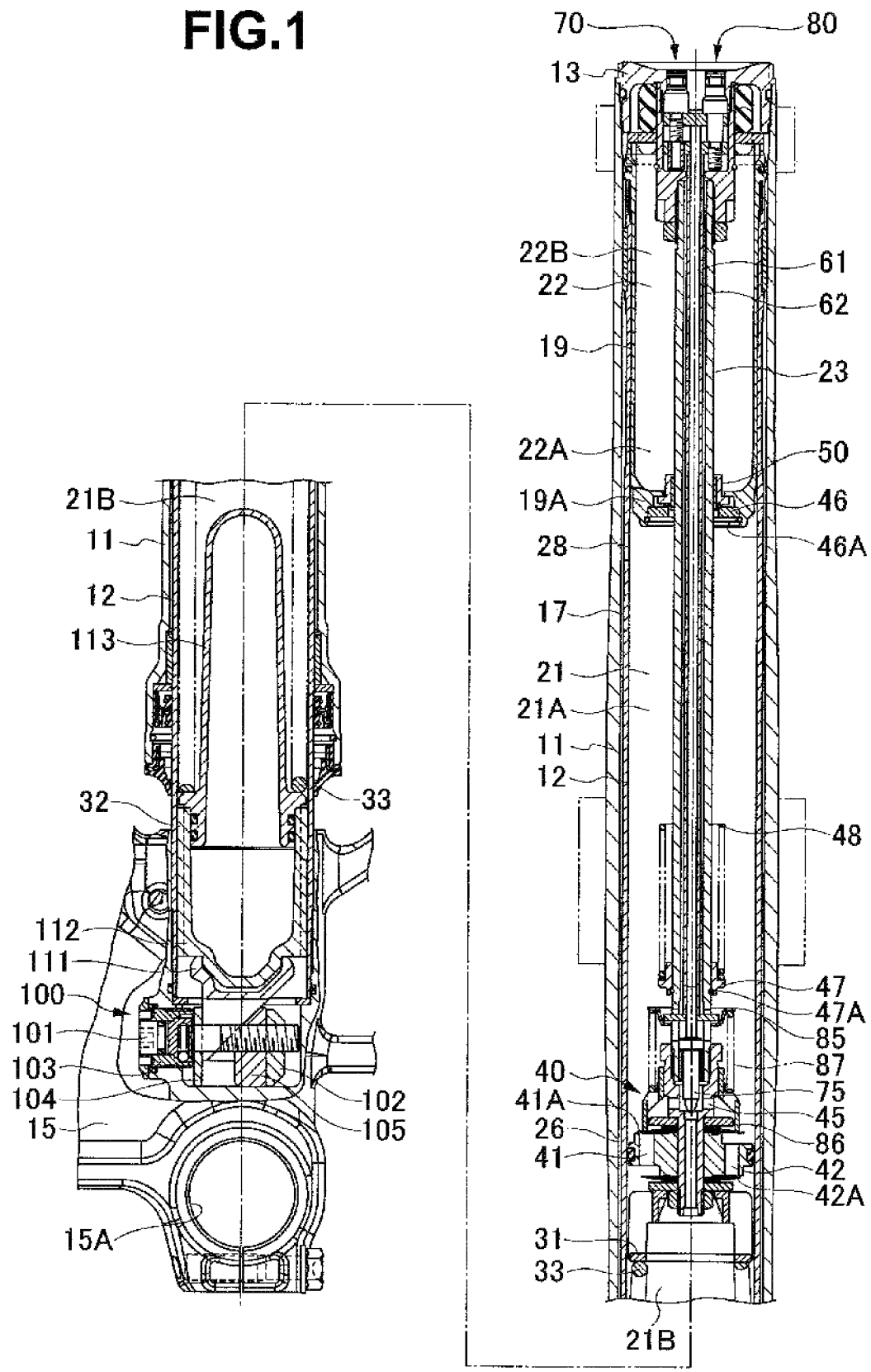
FIG. 1 is a sectional view showing the entire hydraulic shock absorber.
Figure 2:
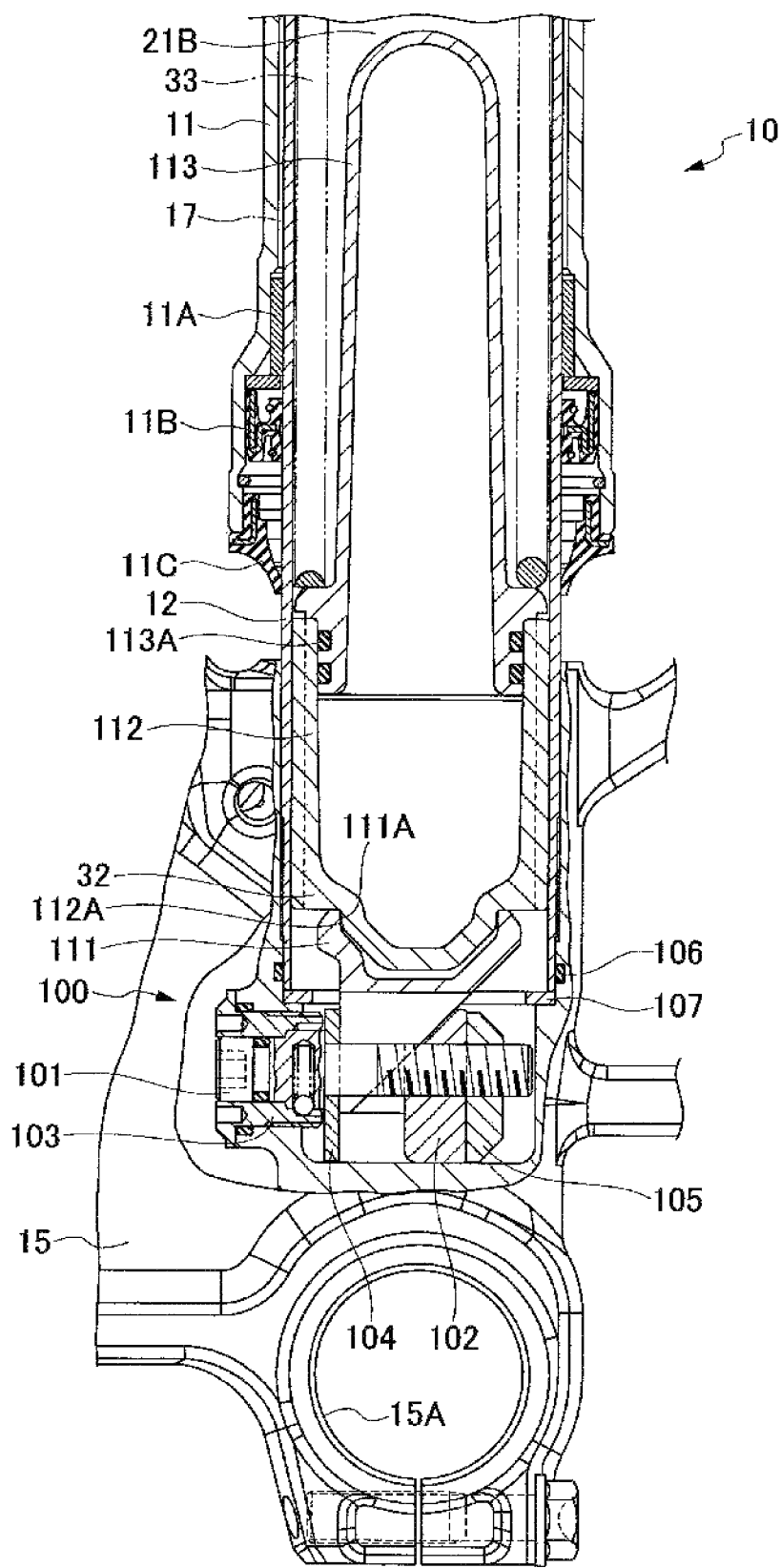
FIG. 2 is a sectional view showing the lower portion of the hydraulic shock absorber shown in FIG. 1.
Figure 3:
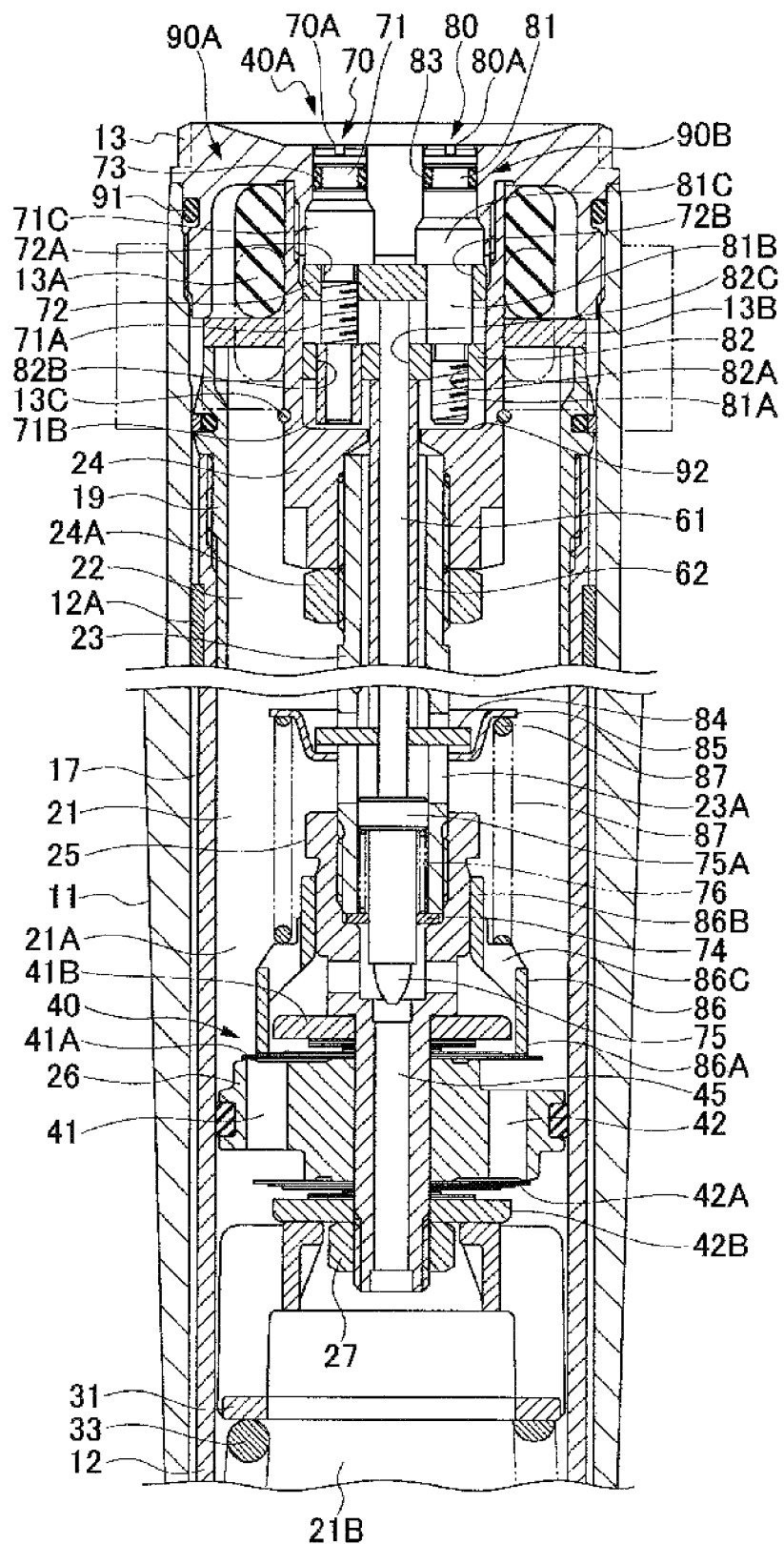
FIG. 3 is a sectional view showing the upper and intermediate portions of the hydraulic shock absorber shown in FIG. 1.

A front fork (a hydraulic shock absorber) 10 is an inverted front fork in which an outer tube 11 is disposed on the side of the vehicle body, and an inner tube 12 is disposed on the side of a wheel. As shown in FIGS. 1 to 3, the inner tube 12 is slidably inserted into the outer tube 11 through a guide bush 11A fixed to an inner periphery of an opening of a lower end of the outer tube 11 and a guide bush 12A fixed to an outer periphery of an opening of an upper end of the inner tube 12. A reference symbol 11B represents an oil seal, and a reference symbol 11C represents a dust seal. A cap 13 is threadedly engaged in a liquid-tight manner with the opening of the upper end of the outer tube 11, and the outer tube 11 is provided at its outer periphery with vehicle body-side mounting members. An axle bracket 15 is threadedly engaged in a liquid-tight manner with the opening of the lower end of the inner tube 12 to form a bottom of the inner tube 12, and the axle bracket 15 is formed with an axle mounting hole 15A.

The front fork 10 defines an annular oil chamber 17 defined by the inner periphery of the outer tube 11, the outer periphery of the inner tube 12 and the two guide bushes 11A and 12A.

The front fork 10 is provided with a closed end cup shaped liquid-tight partition wall member 19 through an O-ring around an inner periphery of an upper end side of the inner tube 12. A working oil chamber 21 is defined in the partition wall member 19 at a position lower than the rod guide portion 19A, and an oil reservoir chamber 22 is defined in the partition wall member at a position higher than the rod guide portion. In the oil reservoir chamber 22, its lower region is an oil chamber 22A, and an upper region is an air chamber 22B. A guide bush 12A provided on an outer periphery of an upper end of the partition wall member 19, which projects from the inner tube 12, and slides on an inner periphery of an outer tube 11.

In the front fork 10, a piston rod 23 mounted on the outer tube 11 is slidably inserted into the rod guide portion 19A of the partition wall member 19. More specifically, a hollow piston rod 23 is threadedly engaged with a mounting collar 24 threadedly engaged with a lower end of a center portion of a cap 13, and tins is fixed by a lock nut 24A.

A piston 26 which comes into slidable contact with an inner periphery of an inner tube 12 is fixed to a piston bolt 25 threadedly engaged with a tip end of the piston rod 23 inserted into the inner tube 12 from a rod guide portion 19A of the partition wall member 19. Oil chamber 21 is defined in a piston rod-side oil chamber 21A in which the piston rod 23 is accommodated and in a piston side oil chamber 21B in which the piston rod 23 is not accommodated. The piston 26 is fixed by a nut 27.

The front fork 10 brings the annular oil chamber 17 into continuous communication with the piston rod-side oil chamber 21A through an oil hole 28 formed in the inner tube 12.

An upper spring receiver 31 of the front fork 10 is mounted on a side of the lower end surface lacing the piston side oil chamber 21B of the piston 26. A lower spring receiver 32 is disposed on a bottom of the inner tube 12 formed by the axle bracket 15, and a main suspension spring 33 is interposed between the upper spring receiver 31 and the lower spring receiver 32. The entire main suspension spring 33 is immersed in a piston side oil chamber 21B. The front fork 10 absorbs an impact force received from a road surface when the vehicle runs by expansion, compression and vibration of the main suspension spring 33. At that time, the spring load adjusting apparatus 100 vertically moves the lower spring receiver 32, and the spring load of the main suspension spring 33 can be adjusted.

In the front fork 10, the piston 26 has a damping force generating apparatus 40 (FIG. 3).

The damping force generating apparatus 40 includes a compression side flow path 41 and an expansion side flow path 42. The compression side flow path 41 is opened and closed by a compression side disk valve 41A (a compression side damping valve) which is backed up by a valve stopper 41B. The expansion side flow path 42 is opened and closed by an expansion side disk valve 42A (an expansion side damping valve) which is backed up by a valve stopper 42B. The valve stopper 41B, the valve 41A, the piston 26, the valve 42A, and the valve stopper 42B constitute a valve assembly inserted into the piston bolt 25, and the valve assembly is sandwiched and fixed by the nut 27 which is threadedly engaged with the piston bolt 25.

The damping force generating apparatus 40 is provided at a center of the cap 13 with a later-described damping force adjusting apparatus 40A. A needle valve 75 of the damping force adjusting apparatus 40A is inserted into a hollow portion of the piston rod 23, and an opening degree of the bypass passage 45 provided in the piston rod 23 is adjusted by vertical motion of a needle valve 75. The bypass passage 45 bypasses the piston 26, and brings the piston rod-side oil chamber 21A and the piston side oil chamber 21B into communication with each other.

In a compression side stroke, the damping force generating apparatus 40 generates a compression side damping force by a passage resistance of the bypass passage 45 whose opening amount is adjusted by the needle valve 75 in the low speed region, and generates a compression side damping force by bending deformation of the compression side disk valve 41A in the intermediate/high speed region. In an expansion side stroke, the damping force generating apparatus 40 generates the expansion side damping force by the passage resistance of the bypass passage 45 whose opening amount is adjusted by the needle valve 75 in the low speed region, and generates the expansion side damping force by bending deformation of the expansion side disk valve 42A in the intermediate/high speed region. The expansion, compression and vibration of the main suspension spring 33 are controlled by the compression side damping force and the expansion side damping force.

In the front fork 10, a stopper rubber 13A and a stopper plate 13B on which an upper end of the partition wall member 19 provided on the inner tube 12 strikes in the most compressed stroke are fixed to a lower end surface of the cap 13, and the most compressed stroke is limited by the stopper rubber 13A.

The front fork 10 has a rebound spring 48 interposed between a spring sheet 46 which is fixed using a stopper ring 46A to a lower end surface of the partition wall member 19 on the side of an upper end of the inner tube 12 facing the piston rod-side oil chamber 21A, and a spring sheet 47 retained to a stopper ring 47A provided on the piston rod 23. When the front fork 10 is at the maximum expansion position, the spring sheet 46 of the side of the partition wall member 19 pressurizes the rebound spring 48 between the spring sheet 47 and the partition wall member 19, thereby limiting the maximum position in the expanded stroke.

Therefore, in the front fork 10, a cross-sectional area S1 of the annular oil chamber 17 comprising an annular gap between the outer tube 11 and the inner tube 12 is greater than a cross-sectional area (area surrounded by an outer diameter) S2 of the piston rod 23 (S1>S2).

The rod guide portion 19A of the partition wall member 19 and the spring sheet 46 are provided with a check valve 50 which permits oil to flow from the oil reservoir chamber 22 into the piston rod-side oil chamber 21A in the compression side stroke, and which prevents oil from flowing from the piston rod-side oil chamber 21A into the oil reservoir chamber 22 in the expansion side stroke.

The rod guide portion 19A of the partition wall member 19 has no oil seal fixed on a periphery of the piston rod 23. Thus, a fine flow path (orifice) 51 (not shown) which brings the piston rod-side oil chamber 21A and the oil reservoir chamber 22 into communication with each other is formed by a fine gap formed around the piston rod 23 by the bush which is press-fitted to the inner periphery of the check valve 50. The fine flow path 51 is pieced in the rod guide portion 19A of the partition wall member 19, and may be formed as an orifice that puts the piston rod-side oil chamber 21A and the oil reservoir chamber 22 in communication with each other.

The hydraulic shock absorber 10 is operated in the following manner.

(Compression Side Stroke)

An entering capacity amount of working oil of the piston rod 23 which enters the inner tube 12 during the compression side stroke is sent to the annular oil chamber 17 from the oil chamber 21A of the inner periphery of the inner tube 12 through the oil hole 28 of the inner tube 12. At that time, since the increased capacity amount $\Delta S1$ (supply amount) of the annular oil chamber 17 is greater than the increased capacity amount $\Delta S2$ of the piston rod 23, a shortage amount ($\Delta S1 - \Delta S2$) of a necessary supply amount of oil into the annular oil chamber 17 is supplied from the oil reservoir chamber 22 through the check valve 50.

In the compression side stroke, as described above, the compression side damping force is generated by the passage resistance of the bypass passage 45 whose opening amount is adjusted by the needle valve 75 in the low speed region, and the compression side damping force is generated by the bending deformation of the compression side disk valve 41A in the intermediate/high speed region.

(Expansion Side Stroke)

In the expansion side stroke, a retreating capacity amount of working oil of the piston rod 23 which is retreated from the inner tube 12 is sent to the oil chamber 21A of the inner periphery of the inner tube 12 through the oil hole 28 of the inner tube 12 from the annular oil chamber 17. At that, time, since the reduced capacity amount $\Delta S1$ (discharge amount) of the annular oil chamber 17 is greater than the reduced capacity amount $\Delta S2$ of the piston rod 23, a surplus amount ($\Delta S1 - \Delta S2$) of oil from the annular oil chamber 17 is discharged into the oil reservoir chamber 22 through the fine flow path 51.

In the expansion side stroke, as described above, the expansion side damping force is generated by the passage resistance of the bypass passage 45 whose opening degree is adjusted by the needle valve 75 in the low speed region, and the expansion side damping force is generated by the bending deformation of the expansion side disk valve 42A in the intermediate/high speed region. The expansion side damping force is also generated by the passage resistance of the fine flow path 51.

The damping force adjusting apparatus 40A will be explained below.

As shown in FIG. 3, the damping force adjusting apparatus 40A includes a first adjusting portion 70 and a second adjusting portion 80 at the cap 13 that is provided at an upper portion of the front fork 10. In the first adjusting portion, two push rods 61 and 62, which are concentrically inserted, are inserted into the hollow portion of the piston rod 23 (the push rod 62 is inserted into the hollow portion of the piston rod 23, and the push rod 61 is inserted into the hollow portion of the push rod 62), and the push rod 61 is moved in the axial direction. The second adjusting portion moves the push rod 62 in the axial direction.

The first adjusting portion 70 adjusts a damping force, which is caused by the passage resistance of the bypass passage 45, by moving the needle valve 75. The second adjusting portion 80 adjusts a damping force, which is caused by the bending deformation of the compression side disk valve 41A, by adjusting the set load of a spring 87 that biases the compression side disk valve 41A in a closing direction. Structures of the first adjusting portion 70 and the second adjusting portion 80, a damping force adjusting structure using the needle valve 75, and a damping force adjusting structure using the spring 87 will be described.

(Structures of First Adjusting Portion 70 and Second Adjusting Portion 80) (FIG. 3)

A cap assembly 90A is formed by threadedly engaging the mounting collar 24 with the lower end opening of the cap 13. The cap 13 of the cap assembly 90A is threadedly engaged in a liquid tight manner with an upper end opening of the outer tube 11 through the O-ring 91. An upper end of the piston rod 23 is threadedly engaged with a lower end of the mounting collar 24 and is fixed by the lock nut 24A. A stopper rubber 13A is fitted to an annular recess that is formed by the mounting collar 24 and the cap 13 of the cap assembly 90A, and a stopper plate 13B is fitted to an outer periphery of the mounting collar 24. A stopper ring 13C locking the stopper plate 13B is fitted to the outer periphery of the mounting collar.

An adjusting assembly 90B is mounted on the mounting collar 24 and the cap 13 of the cap assembly 90A. The adjusting assembly 90B includes a first adjusting bolt 71 that forms the first adjusting portion 70, a second adjusting bolt 81 that forms the second adjusting portion 80, and first and second adjusting nuts 72 and 82 that correspond to the adjusting bolts 71 and 81, respectively. The first adjusting nut 72 includes a screw hole 72A with which a screw portion 71A of the corresponding first adjusting bolt 71 is threadedly engaged, and a guide hole 72B into which a guide portion 81B of the adjusting bolt 81 is inserted. The second adjusting nut 82 includes a screw hole 82A with which a screw portion 81A of the corresponding second adjusting bolt 81 is threadedly engaged, and a guide hole 82B into which a guide collar 71B fitted to the adjusting bolt 71 is inserted. Accordingly, if the first adjusting bolt 71 is rotated, the first adjusting nut 72 threadedly engaged with the adjusting bolt 71 is prevented from being rotated and is guided in the axial direction by the engagement between the guide hole 72B of the adjusting nut 72 and the guide portion 81B of the adjusting bolt 81. Therefore, the first adjusting nut is vertically moved in the axial direction. Meanwhile, if the second adjusting bolt 81 is rotated, the second adjusting nut 82 threadedly engaged with the adjusting bolt 81 is prevented from being rotated and is guided in the axial direction by the engagement between the guide hole 82B of the adjusting nut 82 and the guide collar 71B of the adjusting bolt 71. Therefore, the second adjusting nut is vertically moved in the axial direction.

The first adjusting bolt 71 of the first adjusting portion 70 and the second adjusting bolt 81 of the second adjusting portion 80, which constitute the adjusting assembly 90B, are inserted in a liquid tight manner into the two loading holes, which are juxtaposed at positions separate from the center of the cap 13, from the rear side of the cap 13 with O-rings 73 and 83 in plan view of the cap 13 constituting the cap assembly 90A. Further, the first and second adjusting bolts 71 and 81 and the adjusting nuts 72 and 82 are received in the central recess 92 of the cap assembly 90A that is formed by threadedly engaging the mounting collar 24 with the cap 13. Flange portions 71C and 81C of the adjusting bolts 71 and 81 are abutted on the lower surface of the cap 13, and the lower end surfaces of the adjusting bolts 71 and 81 approach the bottom of the central recess 92 that is formed by the mounting collar 24. The adjusting nuts 72 and 82 are received in the central recess 92, which is formed by the mounting collar 24, so as to slide on the inner periphery of the central recess. The push rod 61, which projects from the hollow portions of the piston rod 23, and the push rod 62, penetrates a center hole 82C of the second adjusting nut 82 and is abutted against the lower end surface of the first adjusting nut 72. The push rod 62, which projects from the hollow portion of the piston rod 23, is abutted against the lower end surface of the second adjusting nut 82 around the center hole 82C.

Accordingly, an upper end operating portion 70A of the first adjusting bolt 71 of the first adjusting portion 70 and an upper end operating portion 80A of the second adjusting bolt 81 of the second adjusting portion 80 are juxtaposed so as to be flush with the upper surface of the cap 13 at positions that, are separated from the center of the cap 13 in plan view of the cap 13 constituting the cap assembly 90A. Further, the first adjusting bolt 71 of the first adjusting portion 70 is pivotally supported not to move in the axial direction only by the rotation of the cap 13, and the second adjusting bolt 81 of the second adjusting portion 80 is also pivotally supported not to move in the axial direction only by the rotation of the cap 13. Accordingly, if the first adjusting bolt 71 of the first adjusting portion 70 is rotated, it is possible to vertically move the first adjusting nut 72, which is threadedly engaged with the first adjusting bolt 71, in the axial direction, and to move the push rod 61, which is abutted against the first adjusting nut 72, in the axial direction. Meanwhile, if the second adjusting bolt 81 of the second adjusting portion 80 is rotated, it is possible to vertically move the second adjusting nut 82, which is threadedly engaged with the second adjusting bolt 81, in the axial direction, and to move the push rod 62, which is abutted against the second adjusting nut 82, in the axial direction.

(Damping Force Adjusting Structure Using Needle Valve 75) (FIG. 3)

An inner base 74 is inserted into a lower end of the hollow portion of the piston rod 23, and the lower end surface of the piston rod 23 and an inner diameter step portion of the piston bolt 25 sandwich and fix the inner base 74. The inner base 74 may be press-fitted into the hollow portion of the piston rod 23. The needle valve 75 is inserted in a liquid tight manner into the inner periphery of the inner base 74 fixed to the piston rod 23 in this manner. A spring 76, which is interposed between an intermediate flange portion 75A of the needle valve 75 and an upper end surface of the inner base 74, biases the needle valve 75 in the axial direction toward the upper side (in a valve opening direction), and makes the upper end surface of the needle valve 75 be abutted against the lower end surface of the push rod 61.

If the first adjusting bolt 71 of the first adjusting portion 70 vertically moves the push rod 61 in the axial direction as described above, the needle valve 75 that is engaged with the push rod 61 in the axial direction can vertically move with respect to the piston bolt 25, can move forward and rearward with respect to a valve sheet of a vertical hole upper end of the bypass passage 45 provided in the piston bolt 25, and can adjust the opening degree of the bypass passage 45 and the compression side damping force and the expansion side damping forte that are caused by the passage resistance of the bypass passage 45.

(Damping Force Adjusting Structure Using Spring 87) (FIG. 3)

Long guide holes 23A extending in the axial direction are provided on both sides of the lower end of the piston rod 23 in the radial direction, and both side projections of the pushing piece 84 are slidably inserted into the guide holes 23A almost without play. A lower end surface of the push rod 62 which is inserted into the hollow portion of the piston rod 23 contacts directly an upper surface of the pushing piece 84. A cross sectional portion of the needle valve 75 which is loosely inserted into the lower end of the push rod 62 is loosely inserted into a circular hole formed in a center of the pushing piece 84 such that the cross sectional portion can move in the axial direction.

Spring receivers 85 which pushingly contacts both end projections of the pushing piece 84 from below and a valve holding member 86 which pushingly contacts an upper surface (back surface) of the compression side disk valve 41A are disposed around a lower end (piston bolt 25) of the piston rod 23, and a valve holding member spring 87 is interposed between the spring receiver 85 and the valve holding member 86. The spring receiver 85 is of a cup-like shape. The spring receiver 85 pushingly contacts both side projections of the pushing piece 84 at an inner peripheral lower end of the cup, and the spring receiver 85 allows the spring 87 to sit on an upper end outer peripheral flange of the cup. The valve holding member 86 includes an annular holding member 86A which continuously (or intermittently) pushingly contacts the entire circumference of the compression side disk valve 41A at a position of appropriate outer diameter of the upper surface, a slide portion 86B which is slid and guided by an upper end outer periphery of the piston bolt 25, and an oil passage 86C which brings the piston rod side oil chamber 21A into communication with the compression side flow path 41, the expansion side flow path 42 and the bypass passage 45. The valve holding member 86 allows the spring 87 to sit on the outer peripheral step portion.

If the adjusting bolt 81 of the second adjusting portion 80 moves the push rod 62 in the axial direction as described above, the pushing piece 84 against which the lower end surface of the push rod 62 is in contact vertically moves the spring receiver 85 to expand and shrink the valve holding member spring 87, and a set load of the spring 87 is adjusted. With this, the set load of the spring 87 biases the compression side disk valve 41A in its closing direction through the valve holding member 86 so that the compression side damping force via bending deformation of the compression side disk valve 41A can be adjusted. The valve holding member 86 can be replaced by one having different diameter of the holding member 86A. A valve holding member 86 having a holding member 86A of large diameter holds an outer peripheral side of the compression side disk valve 41A, and the damping force is increased from a low speed region of piston speed. A valve holding member 86 having a holding member 86A of small diameter holds an inner peripheral side of the compression side disk valve 41A, and increases the damping force in intermediate and high speed regions of piston speed.

A spring load adjusting apparatus 100, which moves vertically a spring receiver 32 and adjusts a spring load of the suspension spring 33, will be described below.

Figure 4:
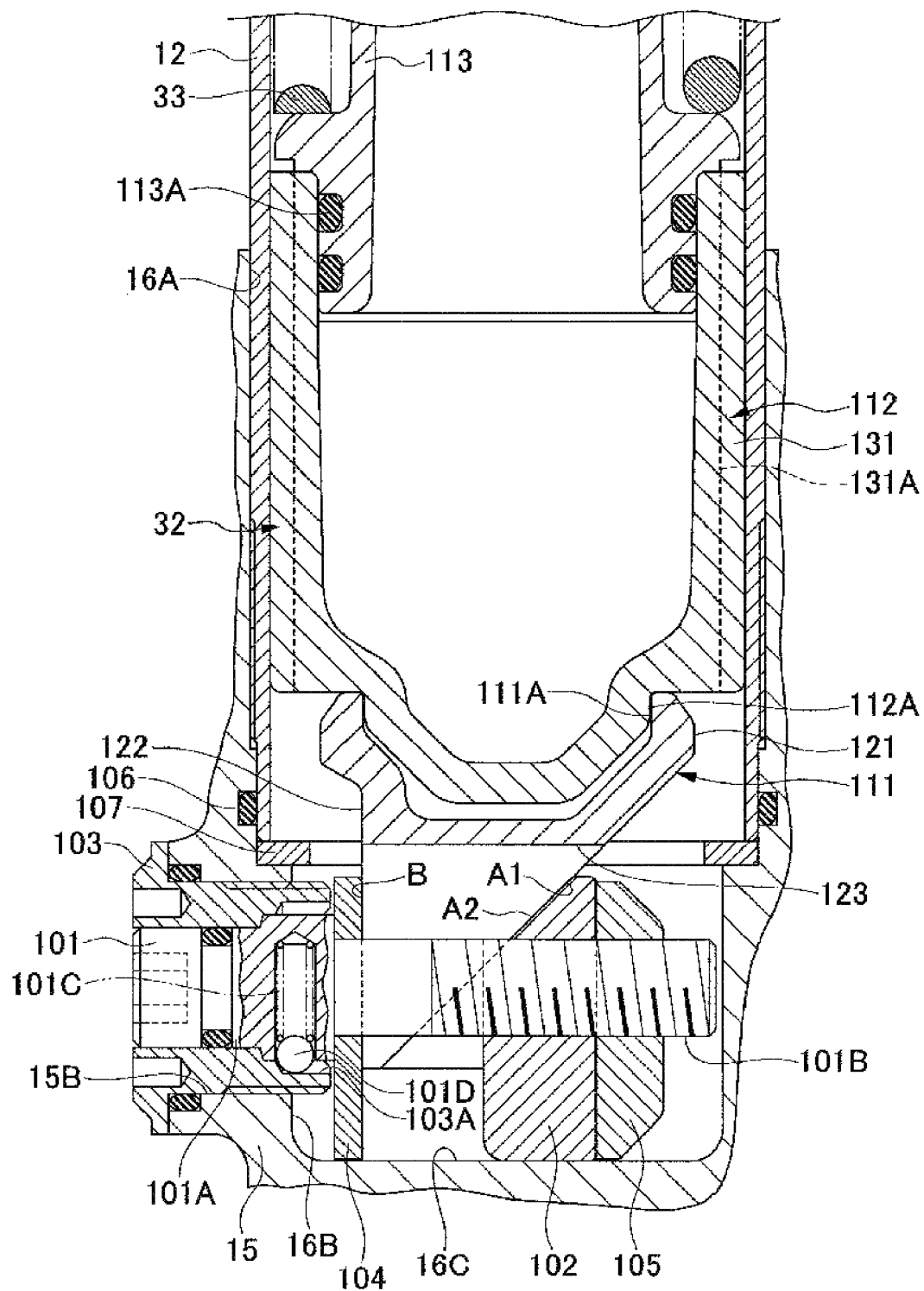
FIG. 4 is a sectional view showing a spring load adjusting portion.

As shown in FIGS. 2 and 4, the spring load adjusting apparatus 100 is built in a small diameter closed hole 16B of an axle bracket 15 that communicates with a large diameter opening hole 16A threadedly engaged with the lower end of the inner tube 12. In the spring load adjusting apparatus 100, an adjusting bolt 101, which faces the outside at a position deviated from an axle mounting hole 15A of the axle bracket 15, is inserted into the small diameter closed hole 16B from the outside of the axle bracket 15. A slider 102, which is provided on a lower surface of a bottom 16C of the small diameter closed hole 16B (slide surface) (the surface facing the lower end of the spring receiver 32), can move straight in a direction intersecting the center axis of the inner tube 12 (in the axial direction of the adjusting bolt 101) via a rotation force of the adjusting bolt 101. A lower slant A1 of the spring receiver 32 (a spring receiver base portion 111 to be described below) is placed on an upper slant A2 of the slider 102, and the spring receiver 32 is supported by the axle bracket 15 through the adjusting bolt 101, the slider 102, and a holder 103. The spring receiver 32 (a spring receiver base portion 111 and a spring receiver cylindrical portion 112 to be described below)

is moved vertically by the rotation of the adjusting bolt 101, so that the spring load of the suspension spring 33 is adjusted.

(1) The holder 103 of the adjusting bolt 101 is threadedly engaged in a liquid right manner with and fixed to a mounting hole 15B that intersects perpendicularly (or diagonally intersects) to a center axis (the same as the center axis passing through the axle mounting hole 15A of the inner tube 12 in a state in which the axle bracket 15 is mounted on the inner tube 12) passing through the axle mounting hole 15A of the axle bracket 15, and penetrates the small diameter closed hole 16B from the outside of the axle bracket 15. As for the adjusting bolt 101, a rotation operating shaft 101A, which includes a hexagonal socket on the outward end surface, is inserted in a liquid tight manner into the holder 103, and a screw shaft 101B is inserted into the small diameter closed hole 16B. As for the adjusting bolt 101, an intermediate step surface of the rotation operating shaft 101A is pushingly contacted with an intermediate step surface of the holder 103 in the axial direction, and an end surface of the screw shaft 101B is pushingly contacted with a vertical wall of the small diameter closed hole 16B. Accordingly, the free movement of the adjusting bolt in the axial direction is limited. In addition, in the adjusting bolt 101, a ball 101D, which is elastically pushed by a spring 101C mounted in a hole pierced on the outer periphery of the rotation operating shaft 101A, can be sequentially engaged with engagement grooves 103A that are formed at a plurality of positions on the inner periphery of the holder 103 in a circumferential direction. Accordingly, the adjusting bolt is locked at an arbitrary rotation operating position corresponding to each of the engagement grooves 103A with a click feeling upon engagement.

Figure 5C:
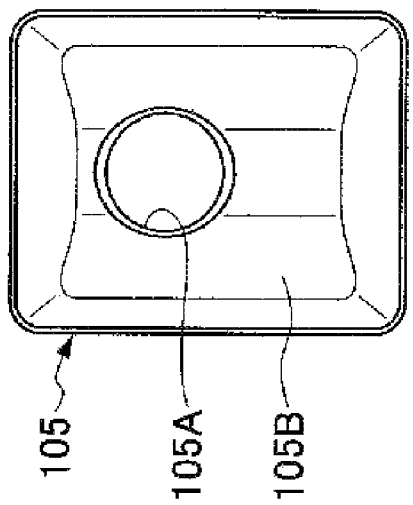
Figure 5B:
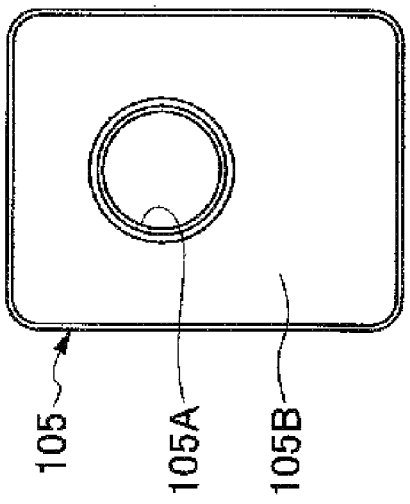
Figure 5A:
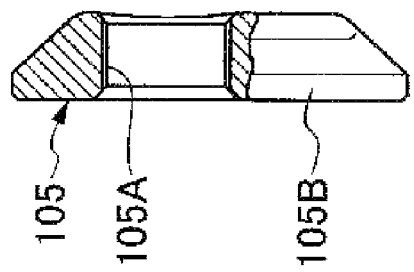
Figure 6A:
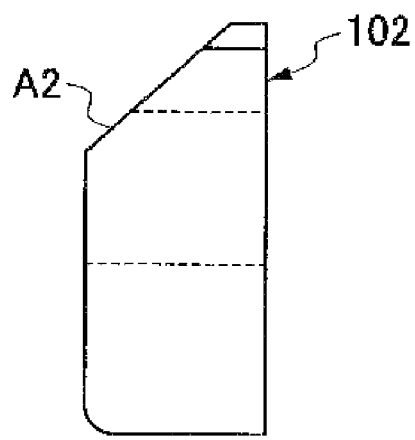
Figure 6B:
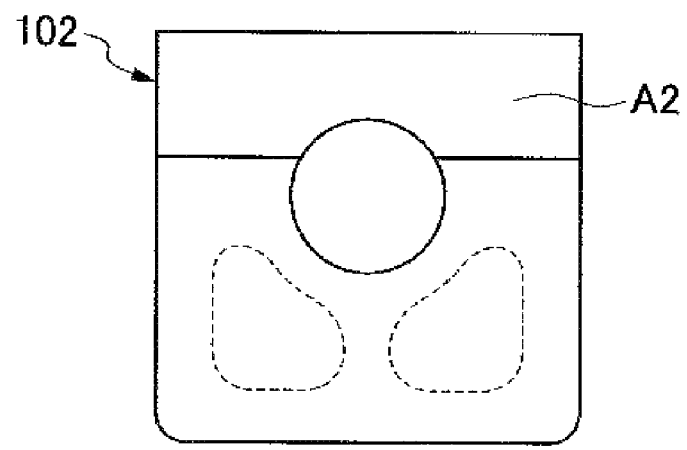

(2) When the rotation operating shaft 101A of the adjusting bolt 101 is pivotally attached to the axle bracket 15 as described in (1), a washer 104, a slider 102, and a nut 105 are inserted into the screw shaft 101B of the adjusting bolt 101. That is, washer 104 is abutted against the step surface that is formed at a boundary between the rotation operating shaft 101A and the screw shaft 101B of the adjusting bolt 101. The washer 104 forms a tetragon, and its lower side is abutted against the bottom 16C of the small diameter closed hole 16B of the axle bracket 15 to prevent the rotation. The slider 102 is inserted into the screw shaft 101B of the adjusting bolt 101, and the nut 105 in abutment with the slider 102 is threadedly engaged with a screw portion of the screw shaft 101B. As shown in FIGS. 5A to 5C, the nut 105 includes a nut portion 105A and a quadrate plate 105B that is continuous with the nut portion 105A. A lower side of the plate 105B is abutted against the bottom 16C of the small diameter closed hole 16B of the axle bracket 15 to prevent rotation. As shown in FIGS. 6A and 6B, the slider 102 forms a tetragon and includes a hole into which the screw shaft 101B of the adjusting bolt 101 is inserted. A lower side of the slider is abutted against the bottom 16C of the small diameter closed hole 16B of the axle bracket 15 to prevent rotation, and its upper side is an upper slant A2.

(3) The spring receiver 32 is divided into a spring receiver base portion 111 and a spring receiver cylindrical portion 112. When the spring receiver base portion 111 is inserted into the large diameter opening hole 16A and the small diameter closed hole 16B of the axle bracket 15 and is engaged with the washer 104 and the slider 102 of the spring load adjusting apparatus 100, the spring receiver base portion is supported while being not rotated relatively with respect to the axle bracket 15, and has an outer diameter smaller than the inner periphery of the inner tube 12. The spring receiver cylindrical portion 112 has a closed-end tubular shape and is inserted into the inner periphery of the inner tube 12 with a small gap, so that the suspension spring 33 can be seated (through a flange of a spring collar 113 in this embodiment). A cylindrical outer peripheral surface of a downward convex (or concave) lower end engagement portion 112A, which is provided at the lower end (bottom) of a cylindrical portion 131 of the spring receiver cylindrical portion 112, is mounted on a round hole-shaped inner peripheral surface of an upward concave (or convex) upper end engagement portion 111A that is provided at an upper end of an annular head portion 121 of the spring receiver base portion 111, so as to be self-aligned. The lower end engagement portion 112A of the spring receiver cylindrical portion 112 is seated on the upper end engagement portion 111A of the spring receiver base portion 111, and the spring receiver cylindrical portion 112 can be concentrically set to the inner tube 12. Meanwhile, in this embodiment, the cup-like spring collar 113 is fitted in a liquid tight manner to the upper end opening portion of the spring receiver cylindrical portion 112 through the O-ring 113A, and the flange of the spring collar 113 is placed on the upper end surface of the spring receiver cylindrical portion 112. The spring receiver cylindrical portion 112 and the spring collar 113 maintain an internal space which is integrally fused to each other in a cavity, and the amount of oil to be charged into the oil chamber 21 of the inner tube 12 is reduced and the weight is reduced.

Figure 7A:
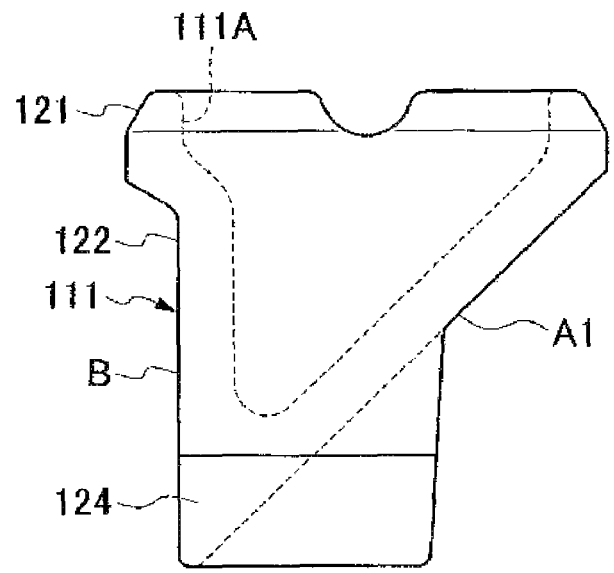
Figure 7B:
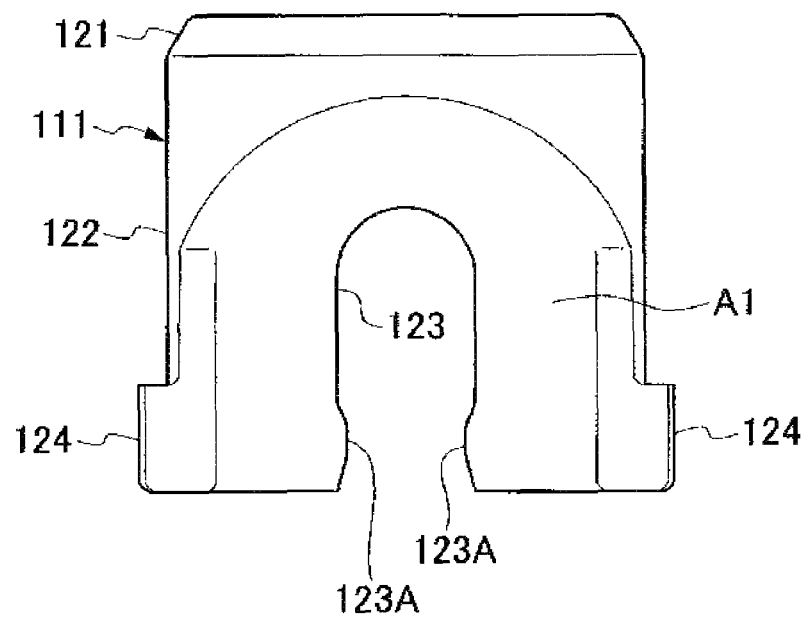

As shown in FIGS. 7A and 7B, in the spring receiver base portion 111, a downward projection 122 projects from a lower portion of the annular head portion 121. One end surface of the downward projection 122 is the lower slant A1 and the other end surface thereof is a lower vertical surface B in side view, and the lower slant A1 and the lower vertical surface B intersect with each other at an acute angle. The spring receiver base portion 111 includes an upper end engagement portion 111A on the inner periphery of the annular head portion 121. The spring receiver base portion 111 includes a U-shaped rotation preventing groove 123 which extends on the central portion of the downward projection 122 in front view from the lower slant A1 to the lower vertical surface B, which opens toward the lower side of the downward projection 122 and is loosely fitted to the outer diameter portion of the screw shaft 101B of the adjusting bolt 101. The U-shaped groove 123 is loosely fitted to the outer diameter portion of the screw shaft 101B of the adjusting bolt 101, so that the spring receiver base portion 111 is prevented from being rotated with respect to the center axis of the axle bracket 15. The spring receiver base portion 111 is engaged with a component of the spring load adjusting apparatus 100, that is, is engaged with the outer diameter portion of the adjusting bolt 101 in this embodiment, so that the spring receiver base portion is supported while being not rotatable with respect to the axle bracket 15.

When being inserted into the small diameter closed hole 16B of the axle bracket 15, the downward projection 122 of the spring receiver base portion 111 is interposed between the slider 102 and the washer 104. Its lower slant A1 is placed on the upper slant A2 of the slider 102, and the lower vertical surface B is abutted against the end surface of the washer 104. The nut 105 and the slider 102 are moved straight by the rotation of the adjusting bolt 101, and the spring receiver base portion 111 and the spring receiver cylindrical portion 112 are moved vertically. At this time, circular arc-shaped outer peripheral surfaces of projecting guide portions 124, which are provided at two positions facing each other in a direction of the diameter of the lower end outer periphery of the downward projection 122, are slidably guided by the circular inner peripheral surface of the small diameter closed hole 16B. Therefore, the spring receiver base portion 111 moves vertically without backlash. The cylindrical outer peripheral surface of the cylindrical portion 131 is slidably guided by the inner peripheral surface of the inner tube 12, so that the spring receiver cylindrical portion 112 moves vertically without backlash.

The spring receiver base portion 111 is inserted into the large diameter opening hole 16A and the small diameter closed hole 16B of the axle bracket 15, the lower slant A1 of the downward projection 122 is placed on the upper slant A2 of the slider 102, and the lower vertical surface B is abutted against the end face of the washer 104. At this time, the annular head portion 121 of the spring receiver base portion 111 has a small outer diameter which does not come in contact with the inner periphery of the inner tube 12 inserted into the large diameter opening hole 16A in the large diameter opening hole 16A. A projecting guide portion 124 of the spring receiver base portion 111 has an outer diameter which comes in slide contact, with the inner periphery of the small diameter closed hole 16B in the small diameter closed hole 16B.

Meanwhile, when the axle bracket 15 is assembled to the front fork 10 that is threadedly engaged with the lower end of the inner tube 12 in the spring load adjusting apparatus 100, upper and lower ends of the inner tube 12 and the axle bracket 15 are vertically inverted to be in an inverted state as described below. In this case, the adjusting bolt 101 is used as fall prevention means 140 of the spring receiver 32 (spring receiver base portion 111), and projecting portions 123A, which form mooring portions 141 to be moored on the outer diameter portion of the adjusting bolt 101, are provided on both side walls of the lower end opening portion of the U-shaped groove 123.

(4) The axle bracket 15 is inserted into and threadedly engaged with the lower end of the inner tube 12. The inner tube 12 and the axle bracket 15 may be assembled while being in an erected state as shown in FIGS. 2 and 4, or may be assembled in an inverted state where the upper and lower ends of the inner tube are vertically inverted as described below. In this case, the adjusting bolt 101, the slider 102, the holder 103, the washer 104, and the nut 105 are assembled to the axle bracket 15 as described above, and the spring receiver base portion 111 of the spring receiver 32 is inserted into the axle bracket. The downward projection 122 of the spring receiver base portion 111 is engaged with the slider 102 and the washer 104. The U-shaped rotation preventing groove 123 of the spring receiver base portion 111 is loosely fitted to the outer diameter portion of the adjusting bolt 101, so that both projecting portions 123A of the U-shaped groove 123 are moored on the outer diameter portion of the adjusting bolt 101. However, the spring receiver cylindrical portion 112 of the spring receiver 32 is not inserted into the axle bracket 15 yet.

The lower end of the inner tube 12 is inserted into the inner periphery of the large diameter opening hole 16A through the O-ring 106, which is fitted to an annular groove of the inner periphery around the lower end of the large diameter opening hole 16A of the axle bracket 15. One of the inner tube 12 and the axle bracket 15 is damped and the other thereof is rotated, so that the lower end of the inner tube 12 is threadedly engaged with the screw portion provided above the O-ring 106 of the large diameter opening hole 16A in the axle bracket 15. In this case, the washer 107 provided on the large diameter opening hole 16A of the axle bracket 15 is seated at a step portion of the boundary between the large diameter opening hole 16A and the small diameter closed hole 16B. A tip of the lower end of the inner tube 12 threadedly engaged with the large diameter opening hole 16A of the axle bracket 15 is pushingly contacted with the washer 107, and the washer 107 is interposed the step portion between the large diameter opening hole 16A and the small diameter closed hole 16B.

(5) The inner tube 12 threadedly engaged with the axle bracket 15 is in the erected state, the spring receiver cylindrical portion 112 of the spring receiver 32 is inserted into the inner tube 12 from the upper end opening of the inner tube 12, the lower end engagement portion 112A of the spring receiver cylindrical portion 112 is seated on the upper end engagement portion 111A of the spring receiver base portion 111, and the spring receiver base portion 111 and the spring receiver cylindrical portion 112 are concentrically set without falling on the center axis of the inner tube 12. The spring collar 113 of the above-mentioned (3) is fitted to the upper end opening portion of the spring receiver cylindrical portion 112. Subsequently, the suspension spring 33 inserted into the inner tube 12 is supported by the spring receiver 32 (the spring receiver base portion 111 and the spring receiver cylindrical portion 112) through the flange of the spring collar 113.

If the adjusting bolt 101 is threadedly moved in a state in which the front fork 10 is assembled, the projecting guide portion 124 of the spring receiver base portion 111 of the spring receiver 32 is guided by the inner peripheral surface of the small diameter closed hole 16B of the axle bracket 15 through the lower slant A1 of the downward projection 122 which are included in the spring receiver base portion 111 of the spring receiver 32, and the upper slant A2 of the slider 102, and moves vertically. Further, the spring receiver cylindrical portion 112 is guided by the inner peripheral surface of the inner tube 12 and moves vertically. The spring receiver 32 adjusts the initial length of the suspension spring 33 between the spring receiver 31 on the side of the piston rod 23 and the spring receiver 32, and adjusts the spring load of the suspension spring 33.

As shown in FIGS. 8A to 8C, in the spring load adjusting apparatus 100, a vertical groove 131A extending over the entire length of the cylindrical portion 131 is provided on the outer periphery of the cylindrical portion 131 of the spring receiver cylindrical portion 112 of the lower spring receiver 32 that slides on the inner periphery of the inner tube 12. Accordingly, the oil chamber 21 in the upper portion of the lower spring receiver 32 is brought into communication with a back surface chamber 21C of the lower spring receiver 32, and as the lower spring receiver 32 moves vertically, oil in the oil chamber 21 can be supplied to and discharged from the back surface chamber 21C.

In the spring load adjusting apparatus 100, the slider 102 may directly be provided with a screw portion (nut portion), or the nut may be fitted and fixed to the slider 102 so that the nut 105 separated from the slider 102 is not required, and the number of parts can be reduced.

Since the spring receiver 32 is divided into the spring receiver base portion 111 and the spring receiver cylindrical portion 112 in the front fork 10, the following effects can be obtained.

(a) The spring receiver 32 is supported so as to be not rotatable with respect to the axle bracket 15, and is divided into the spring receiver base portion 111 that has an outer diameter smaller than the inner periphery of the inner tube 12, and the spring receiver cylindrical portion 112 that is inserted into the inner periphery of the inner tube 12, such that the suspension spring 33 can be seated thereon. Accordingly, when the axle bracket 15 is threadedly rotated in order to be threadedly engaged with the inner tube 12, the spring receiver is not rotated with respect to the axle bracket 15. That is, the spring receiver base portion 111, which is rotated as a single body, has an outer diameter sufficiently smaller than the inner periphery of the inner tube 12. Accordingly, the spring receiver base portion is not engaged with the inner periphery of the inner tube 12, thereby not preventing the thread rotation. Therefore, the axle bracket 15 and the inner tube 12 are smoothly threadedly engaged with each other and damage of the spring receiver 32 and the like is not caused.

(b) The spring receiver cylindrical portion 112 is inserted into the inner periphery of the inner tube 12 with a small gap, the lower end engagement portion 112A provided at the lower end of the spring receiver cylindrical portion 112 is seated on the upper end engagement portion 111A that is provided at the upper end of the spring receiver base portion 111, and the spring receiver cylindrical portion 112 is concentrically set to the inner tube 12. Further, the spring receiver base portion 111 can be assembled without falling.

(c) When the axle bracket 15 is provided with the spring load adjusting apparatus 100, and the spring receiver base portion 111 of the spring receiver 32 is supported to be not rotatable with respect to the axle bracket 15 by being engaged with the spring load adjusting apparatus 100, it is possible to achieve the above-mentioned (a) and (b).

(d) The lower vertical surface B of the spring receiver base portion 111 of the spring receiver 32 is abutted against and engaged with the end surface of the washer 104 of the spring load adjusting apparatus 100, so that the spring receiver base portion 111 is supported to be not rotatable with respect to the axle bracket 15 by being engaged with the washer 104 of the spring load adjusting apparatus 100.

(e) The U-shaped rotation preventing groove 123, which is provided at the lower end of the spring receiver base portion 111 of the spring receiver 32, is loosely fitted to the outer diameter portion of the adjusting bolt 101. Accordingly, the spring receiver base portion 111 is supported to be not rotatable with respect to the axle bracket 15 by being engaged with the adjusting bolt 101 of the spring load adjusting apparatus 100.

Figure 9:
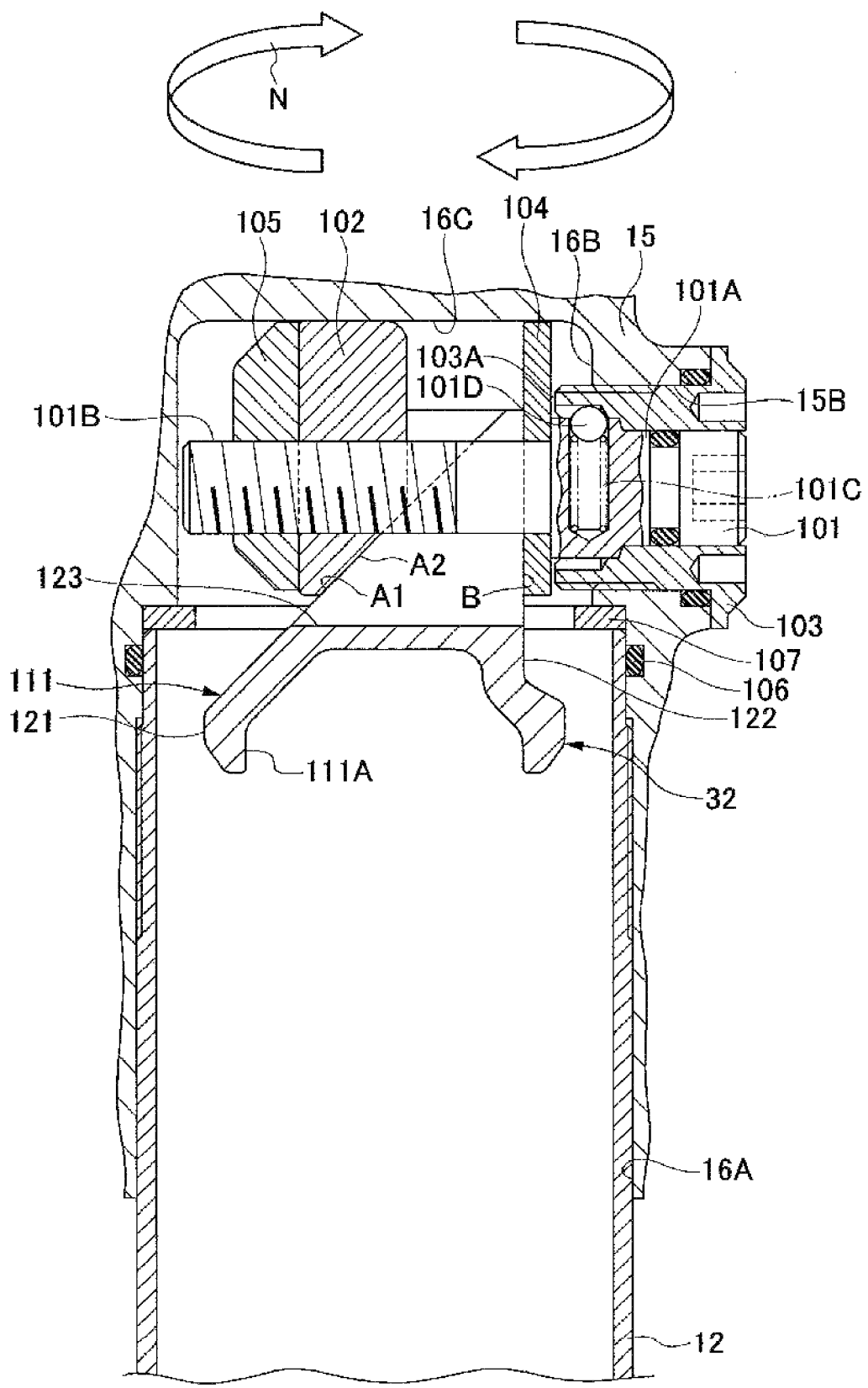
FIG. 9 is a sectional view showing that an axle bracket is inverted and assembled.

The front fork 10 includes the following structures in order to prevent the fall of the spring receiver base portion 111 of the spring receiver 32 that has been previously assembled to the axle bracket 15, when the axle bracket 15 is assembled by being rotated relatively with respect to the lower end of the inner tube 12 from the upper side to a direction indicated by an arrow N in an inverted state where the upper and lower ends of the inner tube 12 and the axle bracket 15 are vertically inverted as shown in FIG. 9.

Figure 10A:
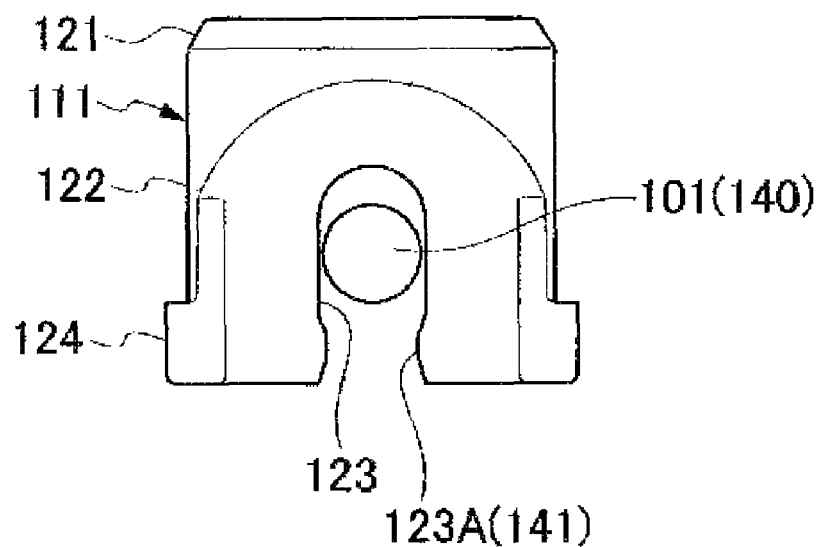
Figure 10B:
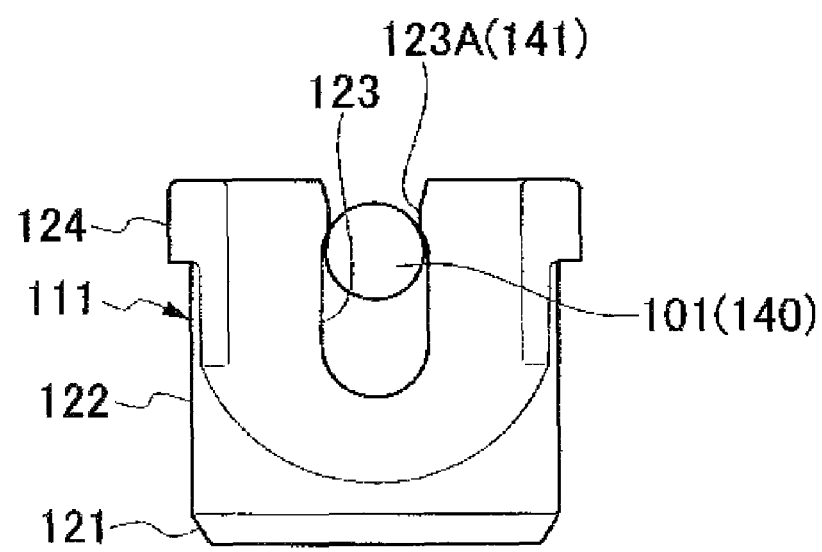

That is, as shown in FIGS. 10A and 10B, in the front fork 10, before the axle bracket 15 is vertically inverted (when the axle bracket 15 is erected), the mooring portions 141 are provided to the spring receiver base portion 111 of the spring receiver 32, which has been previously engaged with the adjusting bolt 101, the slider 102, and the washer 104 on the side of the axle bracket 15. Further, when the axle bracket 15 is vertically inverted (when the axle bracket 15 is inverted), the fall prevention means 140, which is moored at the mooring portions 141 of the spring receiver base portion 111 in order to prevent the fall of the spring receiver base portion 111, is provided on the side of the axle bracket 15.

In this embodiment, as shown in FIGS. 10A and 10B, the adjusting bolt 101 constituting the spring load adjusting apparatus 100 is used as the fall prevention means 140. The U-shaped groove 123 provided at the downward projection 122 of the spring receiver base portion 111 of the spring receiver 32 is loosely fitted to the outer diameter portion of the adjusting bolt 101. The projecting portions 123A, which are formed on both side walls of the lower end opening portion of the U-shaped groove 123, are used as the mooring portions 141 moored on the outer diameter portion of the adjusting bolt 101. FIG. 10A shows the adjusting bolt 101 and the spring receiver base portion 111 when the axle bracket 15 is erected, and FIG. 10B shows the adjusting bolt 101 and the spring receiver base portion 111 when the axle bracket 15 is inverted.

Accordingly, the front fork 10 is provided with the fall prevention means 140 and the mooring portion 141, so that the following effects can be obtained.

(a) When the upper and lower ends of the inner tube 12 are vertically inverted and the axle bracket 15 is assembled to the lower end of the inner tube 12 from above, the mooring portions 141 of the spring receiver 32, which has been previously assembled to the axle bracket 15, are moored at the fall prevention means 140 that is provided on the side of the axle bracket 15, thereby preventing the fall.

(b) When the spring receiver 32 is assembled to the axle bracket 15 to be not rotatable with respect to the axle bracket 15, the spring receiver 32 does not fall due to the above-mentioned (a) even though the axle bracket 15 is vertically inverted. Accordingly, it is possible to stably maintain an assembling state in which the spring receiver is not rotatable with respect to the axle bracket 15, and troublesome reassembling in the axle bracket 15 is not caused.

(c) Both projecting portions 123A (mooring portions 141) of the lower end opening portion of the U-shaped groove 123 provided at the end of the spring receiver 32, which has been previously assembled to the axle bracket 15, are moored on the outer diameter portion of the adjusting bolt 101 (fall prevention means 140) of the spring load adjusting apparatus 100 that is included in the axle bracket 15, thereby preventing the fall.

(d) The U-shaped groove 123 of the lower end of the spring receiver 32 is loosely fitted to the outer diameter portion of the adjusting bolt 101 of the spring load adjusting apparatus 100, and it is possible to stably maintain an assembling state in which the spring receiver 32 is not rotatable with respect to the axle bracket 15.

Figure 11A:
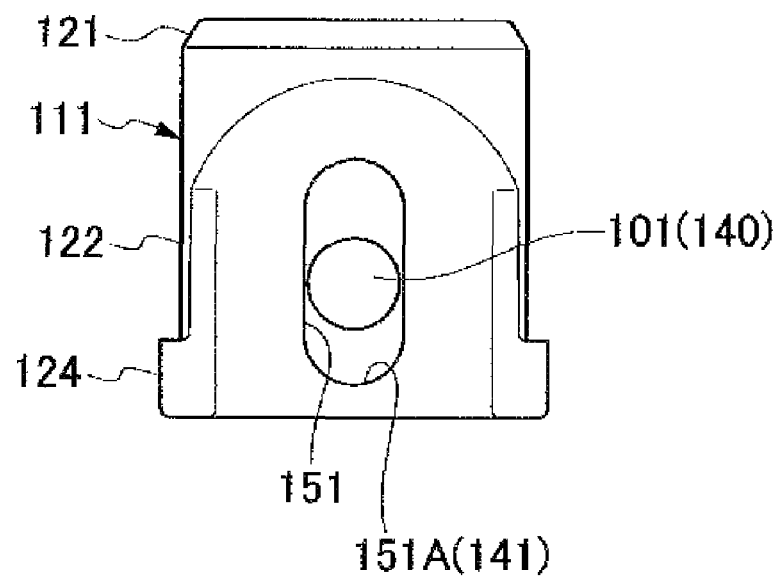
Figure 11B:
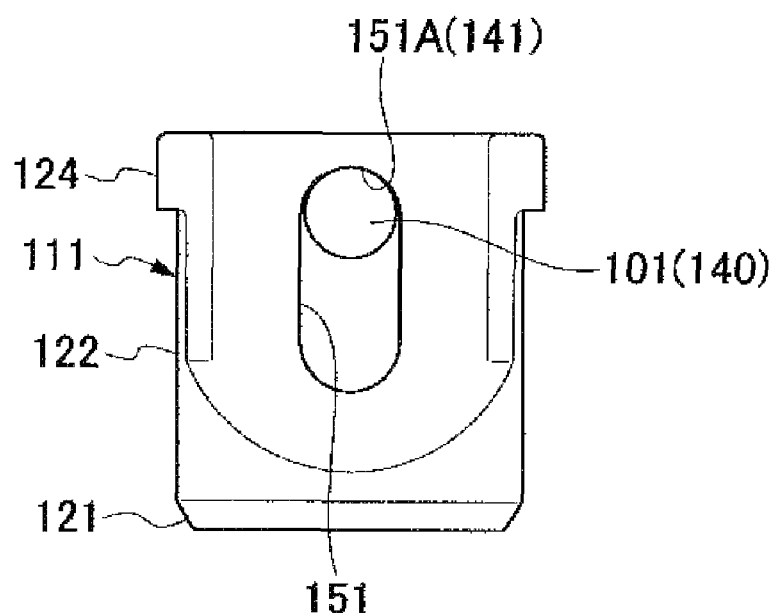

FIGS. 11A and 11B show the modifications of the fall prevention means 140 and the mooring portion 141 of the front fork 10. That is, the adjusting bolt 101 constituting the spring load adjusting apparatus 100 is used as the fall prevention means 140. A rotation preventing long hole 151 (having a function of preventing the rotation of the spring receiver base portion 111 similar to the U-shaped groove 123 instead of the U-shaped rotation preventing groove 123), which is provided at the downward projection 122 of the spring receiver base portion 111 of the spring receiver 32, is loosely fitted to the outer diameter portion of the adjusting bolt 101. A lower end closed portion 151A of the long hole 151 is used as the mooring portion 141 that is moored on the outer diameter portion of the adjusting bolt 101. According to this, the following effects can be obtained.

(a) The lower end closed portion 151A (mooring portions 141) of the long hole 151 provided at the lower end of the spring receiver 32, which has been previously assembled to the axle bracket 15, is moored on the outer diameter portion of the adjusting bolt 101 (fall prevention means 140) of the spring load adjusting apparatus 100 that is included in the axle bracket 15, thereby preventing the fall.

(b) The long hole 151 of the lower end of the spring receiver 32 is loosely fitted to the outer diameter portion of the adjusting bolt 101 of the spring load adjusting apparatus 100, and it is possible to stably maintain an assembling state in which the spring receiver 32 is not rotatable with respect to the axle bracket 15.

Figure 12A:
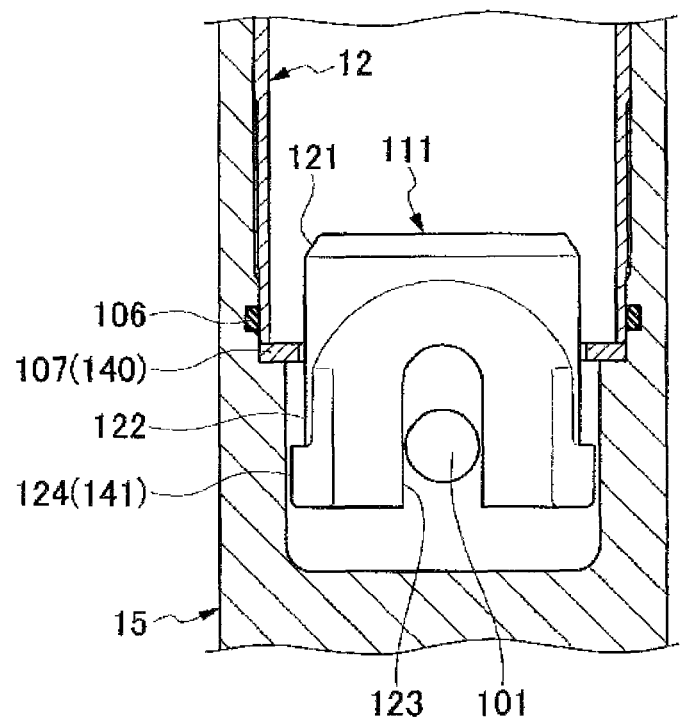
Figure 12B:
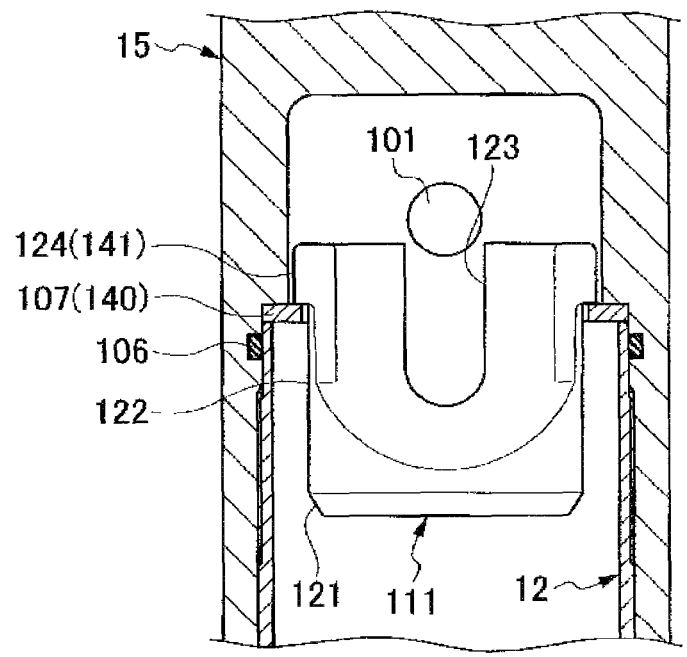

FIGS. 12A and 12B show the modifications of the fall prevention means 140 and the mooring portion 141 of the front fork 10. An annular projecting portion, which is provided around the spring receiver 32 (spring receiver base portion 111) in the axle bracket 15, that is, the above-mentioned washer 107 in this embodiment, is used as the fall prevention means 140. A projecting portion provided on the outer periphery of the spring receiver base portion 111, that is, the projecting guide portion 124 in this embodiment, is used as the mooring portion 141 that is moored to the washer 107 on the side of the axle bracket 15. The washer 107 provided at the lower end of the large diameter opening hole 16A of the axle bracket 15 is moored by the O-ring 106 that is fitted to the annular groove formed near the lower end of the large diameter opening hole 16A, and is not separated. The projecting guide portion 124 of the spring receiver base portion 111 is moored at the washer 107, thereby preventing the fall. According to this, the following effects can be obtained.

(a) The projecting guide portion 124 (mooring portion 141) provided on the outer periphery of the spring receiver 32 (spring receiver base portion 111), which has been previously assembled to the axle bracket 15, is moored at the washer 107 (fall prevention means 140) provided around the spring receiver 32 (spring receiver base portion 111) in the axle bracket 15, thereby preventing the fall.

(b) The U-shaped groove 123 of the lower end of the spring receiver 32 (spring receiver base portion 111) is loosely fitted to the outer diameter portion of the adjusting bolt 101 of the spring load adjusting apparatus 100, and it is possible to stably maintain an assembling state in which the spring receiver 32 (spring receiver base portion 111) is not rotatable with respect to the axle bracket 15.

Figure 13A:
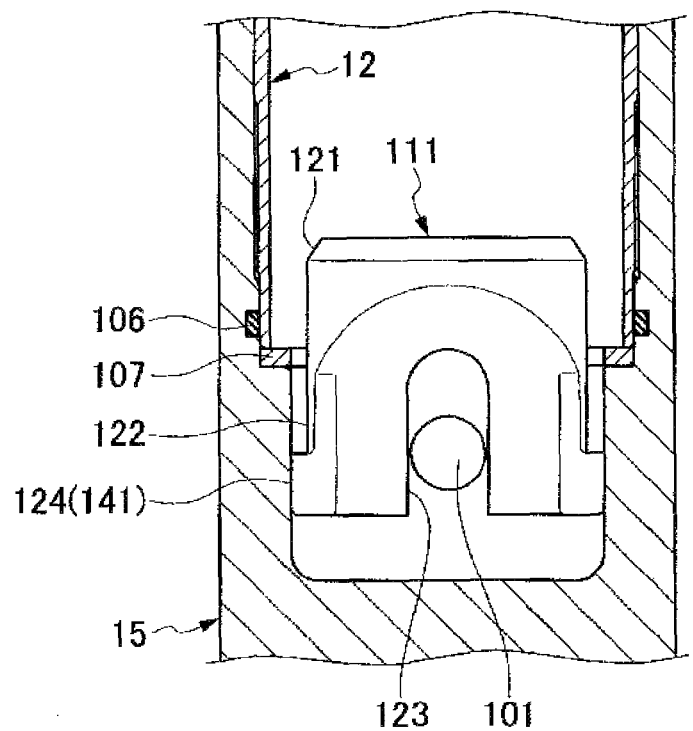
Figure 13B:
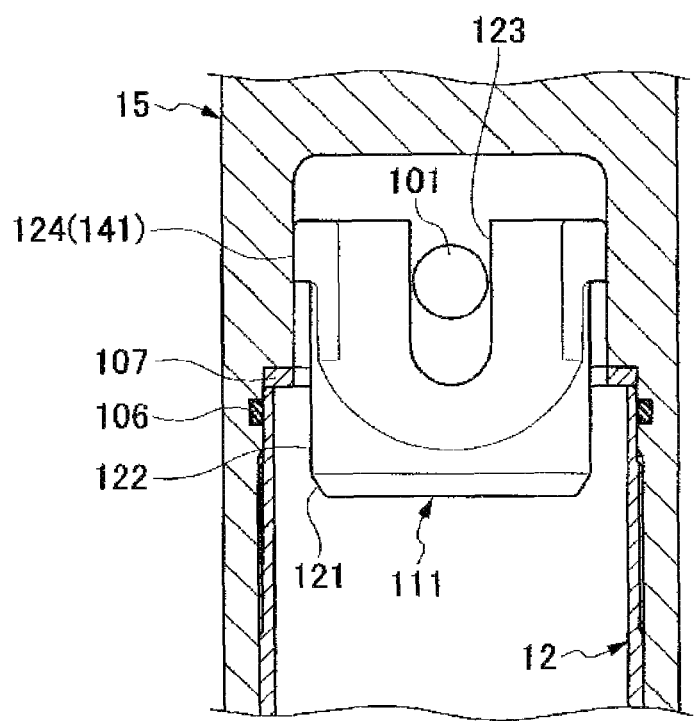

FIGS. 13A and 13B show the modifications of the fall prevention means 140 and the mooring portion 141 of the front fork 10. That is, an inner peripheral surface of the small diameter closed hole 16B, which is provided around the spring receiver 32 (spring receiver base portion 111) in the axle bracket 15, is used as the fall prevention means 140. A projecting portion, which is provided on the outer periphery of the spring receiver base portion 111, that is, a projecting guide portion 124 in this embodiment is used as the mooring portion 141 that is moored while being lightly press-fitted to the inner peripheral surface of the small diameter closed hole 16B. According to this, the following effects can be obtained.

(a) The projecting guide portion 124 (mooring portion 141) provided on the outer periphery of the spring receiver 32 (spring receiver base portion 111), which has been previously assembled to the axle bracket 15, is lightly press-fitted to the inner peripheral surface (fall prevention means 140) provided around the spring receiver 32 (spring receiver base portion 111) in the axle bracket 15, thereby preventing the fall.

(b) The U-shaped groove 123 of the lower end of the spring receiver 32 (spring receiver base portion 111) is loosely fitted to the outer diameter portion of the adjusting bolt 101 of the spring load adjusting apparatus 100, and it is possible to stably maintain an assembling state in which the spring receiver 32 (spring receiver base portion 111) is not rotatable with respect to the axle bracket 15.

Meanwhile, in the front fork 10, the O-ring is fitted to the outer peripheral groove of the lower spring receiver 32 (spring receiver cylindrical portion 112), so that the lower spring receiver 32 may be fitted in a liquid tight manner to the inner periphery of the inner tube 12 in the inner tube 12, and the oil chamber 21 of the upper portion of the lower spring receiver 32 may be sealed in a liquid tight manner against the back surface chamber 21C of the lower spring receiver 32. According to this, the vertical movement of the lower spring receiver 32 in the inner tube 12 causes the oil level of the oil reservoir chamber 22 to vertically move through the working oil chamber 21 of the inner tube 12. Therefore, the spring load of the suspension spring 33 is adjusted by the vertical movement of the lower spring receiver 32, and the air chamber 22B is expanded or compressed by the upward movement of the oil level of the oil reservoir chamber 22. As a result, it is also possible to adjust the spring load of the air spring.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A hydraulic shock absorber in which a lower end of an axle-side tube slidably inserted into a vehicle body-side tube is threadedly engaged with an axle bracket, and a lower end of a suspension spring interposed between the vehicle body-side tube and the axle-side tube is seated on a spring receiver supported to be not rotatable with respect to the axle bracket in the axle-side tube, wherein the spring receiver is divided into a spring receiver base portion that is supported to be not rotatable with respect to the axle bracket and has an outer diameter smaller than an inner periphery of the axle-side tube, and a spring receiver cylindrical portion that is inserted into an inner periphery of the axle-side tube and the suspension spring is seated thereon, wherein a lower end engagement portion provided at a lower end of the spring receiver cylindrical portion is seated on an upper end engagement portion provided at an upper end of the spring receiver base portion, so that the spring receiver cylindrical portion is concentrically set to the axle side tube, wherein the axle bracket is provided with a spring load adjusting portion that adjusts a spring load of the suspension spring by vertically moving the spring receiver, and the spring receiver base portion of the spring receiver is supported to be not rotatable with respect to the axle bracket by being engaged with the spring load adjusting portion, wherein the spring load adjusting portion supports an adjusting bolt by the axle bracket so that the adjusting bolt is rotatable, a washer being abutted against a step surface of one end side of the adjusting bolt, a slide inserted into the other end side of the adjusting bolt, the slide capable of straight movement in a direction intersecting a center axis of the axle-side tube, by a rotation force of the adjusting bolt, a lower slant of the spring receiver base portion placed on an upper slant of the slider, a lower vertical surface of the spring receiver base portion abutted against an end surface of the washer, the spring receiver base portion and the spring receiver cylindrical portion movable vertically by the rotation of the adjusting bolt.

2. The hydraulic shock absorber according to claim 1, wherein a U-shaped rotation preventing groove, which is provided at the lower end of the spring receiver base portion of the spring receiver, is loosely fitted to an outer diameter portion of the adjusting bolt.

3. The hydraulic shock absorber according to claim 2, wherein the spring receiver cylindrical portion has a closed-end tubular cylindrical shape, a spring collar is fitted in a liquid tight manner to an upper end opening portion of the spring receiver cylindrical portion, and a flange of the spring collar is placed on an upper end surface of the spring receiver cylindrical portion.

4. The hydraulic shock absorber according to claim 3, wherein the lower end engagement portion forms a downward convex cylindrical outer peripheral surface, the cylindrical outer peripheral surface is mounted on a round hole-shaped inner peripheral surface of an upward concave upper end engagement portion that is provided at an upper end of an annular head portion of the spring receiver base portion, so as to be self-aligned, and the lower end engagement portion of the spring receiver cylindrical portion is seated on the upper end engagement portion of the spring receiver base portion.

5. The hydraulic shock absorber according to claim 2, wherein the lower end engagement portion forms a downward convex cylindrical outer peripheral surface, the cylindrical outer peripheral surface is mounted on a round hole-shaped inner peripheral surface of an upward concave upper end engagement portion that is provided at an upper end of an annular head portion of the spring receiver base portion, so as to be self-aligned, and the lower end engagement portion of the spring receiver cylindrical portion is seated on the upper end engagement portion of the spring receiver base portion.

6. The hydraulic shock absorber according to claim 1, wherein the spring receiver cylindrical portion has a closed-end tubular cylindrical shape, a spring collar is fitted in a liquid tight manner to an upper end opening portion of the spring receiver cylindrical portion, and a flange of the spring collar is placed on an upper end surface of the spring receiver cylindrical portion.

7. The hydraulic shock absorber according to claim 6, wherein the lower end engagement portion forms a downward convex cylindrical outer peripheral surface, the cylindrical outer peripheral surface is mounted on a round hole-shaped inner peripheral surface of an upward concave upper end engagement portion that is provided at an upper end of an annular head portion of the spring receiver base portion, so as to be self-aligned, and the lower end engagement portion of the spring receiver cylindrical portion is seated on the upper end engagement portion of the spring receiver base portion.

8. The hydraulic shock absorber according to claim 1, wherein the lower end engagement portion forms a downward convex cylindrical outer peripheral surface, the cylindrical outer peripheral surface is mounted on a round hole-shaped inner peripheral surface of an upward concave upper end engagement portion that is provided at an upper end of an annular head portion of the spring receiver base portion, so as to be self-aligned, and the lower end engagement portion of the spring receiver cylindrical portion is seated on the upper end engagement portion of the spring receiver base portion.

9. The hydraulic shock absorber according to claim 1, wherein in the spring receiver base portion, a downward projection projects from a lower portion of an annular head portion, one end surface of the downward projection is the lower slant and the other end surface thereof is the lower vertical surface in side view, the lower slant and the lower vertical surface intersect with each other at an acute angle, and the upper end engagement portion is provided on the inner periphery of the annular head portion.

10. The hydraulic shock absorber according to claim 1, wherein the spring load adjusting portion includes a vertical groove, which extends over the entire length of the cylindrical portion, on the outer periphery of a cylindrical portion of the spring receiver cylindrical portion of the spring receiver that slides on the inner periphery of the axle-side tube.

11. A hydraulic shock absorber in which a lower end of an axle-side tube slidably inserted into a vehicle body-side tube is threadedly engaged with an axle bracket, and a lower end of a suspension spring interposed between the vehicle body-side tube and the axle-side tube is seated on a spring receiver supported to be not rotatable with respect to the axle bracket in the axle-side tube, wherein the spring receiver is divided into a spring receiver base portion that is supported to be not rotatable with respect to the axle bracket and has an outer diameter smaller than an inner periphery of the axle-side tube, and a spring receiver cylindrical portion that is inserted into an inner periphery of the axle-side tube and the suspension spring is seated thereon, wherein a lower end engagement portion provided at a lower end of the spring receiver cylindrical portion is seated on an upper end engagement portion provided at an upper end of the spring receiver base portion, so that the spring receiver cylindrical portion is concentrically set to the axle side tube, wherein the spring receiver cylindrical portion has a closed-end tubular cylindrical shape, a spring collar is fitted in a liquid tight manner to an upper end opening portion of the spring receiver cylindrical portion, and a flange of the spring collar is placed on an upper end surface of the spring receiver cylindrical portion.

12. The hydraulic shock absorber according to claim 11, wherein the lower end engagement portion forms a downward convex cylindrical outer peripheral surface, the cylindrical outer peripheral surface is mounted on a round hole-shaped inner peripheral surface of an upward concave upper end engagement portion that is provided at an upper end of an annular head portion of the spring receiver base portion, so as to be self-aligned, and the lower end engagement portion of the spring receiver cylindrical portion is seated on the upper end engagement portion of the spring receiver base portion.

13. A hydraulic shock absorber in which a lower end of an axle-side tube slidably inserted into a vehicle body-side tube is threadedly engaged with an axle bracket, and a lower end of a suspension spring interposed between the vehicle body-side tube and the axle-side tube is seated on a spring receiver supported to be not rotatable with respect to the axle bracket in the axle-side tube, wherein the spring receiver is divided into a spring receiver base portion that is supported to be not rotatable with respect to the axle bracket and has an outer diameter smaller than an inner periphery of the axle-side tube, and a spring receiver cylindrical portion that is inserted into an inner periphery of the axle-side tube and the suspension spring is seated thereon, wherein a lower end engagement portion provided at a lower end of the spring receiver cylindrical portion is seated on an upper end engagement portion provided at an upper end of the spring receiver base portion, so that the spring receiver cylindrical portion is concentrically set to the axle side tube, the axle bracket is provided with a spring load adjusting portion that adjusts a spring load of the suspension spring by vertically moving the spring receiver, and the spring receiver base portion of the spring receiver is supported to be not rotatable with respect to the axle bracket by being engaged with the spring load adjusting portion, wherein the spring receiver cylindrical portion has a closed-end tubular cylindrical shape, a spring collar is fitted in a liquid tight manner to an upper end opening portion of the spring receiver cylindrical portion, and a flange of the spring collar is placed on an upper end surface of the spring receiver cylindrical portion.

14. The hydraulic shock absorber according to claim 13, wherein the lower end engagement portion forms a downward convex cylindrical outer peripheral surface, the cylindrical outer peripheral surface is mounted on a round hole-shaped inner peripheral surface of an upward concave upper end engagement portion that is provided at an upper end of an annular head portion of the spring receiver base portion, so as to be self-aligned, and the lower end engagement portion of the spring receiver cylindrical portion is seated on the upper end engagement portion of the spring receiver base portion.

15. A hydraulic shock absorber in which a lower end of an axle-side tube slidably inserted into a vehicle body-side tube is threadedly engaged with an axle bracket, and a lower end of a suspension spring interposed between the vehicle body-side tube and the axle-side tube is seated on a spring receiver supported to be not rotatable with respect to the axle bracket in the axle-side tube, wherein the spring receiver is divided into a spring receiver base portion that is supported to be not rotatable with respect to the axle bracket and has an outer diameter smaller than an inner periphery of the axle-side tube, and a spring receiver cylindrical portion that is inserted into an inner periphery of the axle-side tube and the suspension spring is seated thereon, wherein a lower end engagement portion provided at a lower end of the spring receiver cylindrical portion is seated on an upper end engagement portion provided at an upper end of the spring receiver base portion, so that the spring receiver cylindrical portion is concentrically set to the axle side tube, wherein the lower end engagement portion forms a downward convex cylindrical outer peripheral surface, the cylindrical outer peripheral surface is mounted on a round hole-shaped inner peripheral surface of an upward concave upper end engagement portion that is provided at an upper end of an annular head portion of the spring receiver base portion, so as to be self-aligned, and the lower end engagement portion of the spring receiver cylindrical portion is seated on the upper end engagement portion of the spring receiver base portion.

16. A hydraulic shock absorber in which a lower end of an axle-side tube slidably inserted into a vehicle body-side tube is threadedly engaged with an axle bracket, and a lower end of a suspension spring interposed between the vehicle body-side tube and the axle-side tube is seated on a spring receiver supported to be not rotatable with respect to the axle bracket in the axle-side tube, wherein the spring receiver is divided into a spring receiver base portion that is supported to be not rotatable with respect to the axle bracket and has an outer diameter smaller than an inner periphery of the axle-side tube, and a spring receiver cylindrical portion that is inserted into an inner periphery of the axle-side tube and the suspension spring is seated thereon, wherein a lower end engagement portion provided at a lower end of the spring receiver cylindrical portion is seated on an upper end engagement portion provided at an upper end of the spring receiver base portion, so that the spring receiver cylindrical portion is concentrically set to the axle side tube, wherein the axle bracket is provided with a spring load adjusting portion that adjusts a spring load of the suspension spring by vertically moving the spring receiver, and the spring receiver base portion of the spring receiver is supported to be not rotatable with respect to the axle bracket by being engaged with the spring load adjusting portion, wherein the lower end engagement portion forms a downward convex cylindrical outer peripheral surface, the cylindrical outer peripheral surface is mounted on a round hole-shaped inner peripheral surface of an upward concave upper end engagement portion that is provided at an upper end of an annular head portion of the spring receiver base portion, so as to be self-aligned, and the lower end engagement portion of the spring receiver cylindrical portion is seated on the upper end engagement portion of the spring receiver base portion.

\* \* \* \* \*